United States Patent

Mick

[11] Patent Number: 5,836,332
[45] Date of Patent: Nov. 17, 1998

[54] SHOPPING CART CANOPY

[76] Inventor: James Mick, 713 Bismarck St., Toms River, N.J. 08757

[21] Appl. No.: 925,057

[22] Filed: Sep. 8, 1997

[51] Int. Cl.[6] .................................................. E04H 15/36
[52] U.S. Cl. .......................... 135/124; 135/126; 135/161; 296/105; 296/100
[58] Field of Search .................................... 135/124, 125, 135/126, 128, 130, 143, 144, 147, 151, 153, 155, 161, 906, 96; 296/100, 104, 105, 107, 108

[56] References Cited

U.S. PATENT DOCUMENTS

| | | | |
|---|---|---|---|
| 1,509,882 | 9/1924 | Severin | 135/144 |
| 2,731,972 | 1/1956 | Braun | 135/125 |
| 3,892,094 | 7/1975 | Spray | 135/125 |
| 4,096,874 | 6/1978 | Weatherly | 135/124 |
| 4,332,266 | 6/1982 | Wageley | 135/143 |
| 5,331,777 | 7/1994 | Chi-Yuan | 135/124 X |
| 5,538,313 | 7/1996 | Henning | 296/100 |
| 5,575,301 | 11/1996 | Bolton | 135/124 X |

Primary Examiner—Lanna Mai
Attorney, Agent, or Firm—Clifford G. Frayne

[57] ABSTRACT

A protective canopy for a shopping cart transformable from a folded storage state to a dome-like canopy of frame structure with waterproof material secured thereto, the protective canopy having a snap fit handle to engage the handle of a shopping cart and a removably securable tab to secure front end of the canopy to the front end of the shopping cart.

5 Claims, 4 Drawing Sheets

SHOPPING CART CANOPY

BACKGROUND OF THE INVENTION

1. Field of Invention

This invention relates to a cover device for covering shopping carts of the type routinely used in grocery stores to transport purchased items from inside the store to the parking lot outside the store. The novel cover according to this invention may be transformed by the shopper from a folded compact mode to a canopy mode whereby it is secured to the handles of the shopping cart and to the front end of the shopping cart and provides protection against exposure of the groceries to sun, rain, snow, sleet, and dust, which are oftentimes encountered in transporting groceries from the store to the motor vehicle.

2. Description of the Prior Art

There have been various attempts to develop a cover for a shopping cart which is both convenient and easy to use and durable. Walton in U.S. Pat. No. 5,271,634 discloses a method for covering a shopping cart using a spring loaded cover, extendable from a roller mounted on the rear of the shopping cart and attachable to the front of the shopping cart. Powers in U.S. Design Pat. No. 361,540 shows a shopping cart cover equipped with hooks to secure it to the shopping cart. Walters in U.S. Pat. No. 4,960,302 discloses a shopping cart bonnet which is shaped to conform to the trapezoidal shape of the shopping cart and has depending side elements so as to fully encapsulate the shopping cart and protect the groceries from the elements.

Applicant's canopy structure is designed to be utilized by the shopper and when not in use, to be stored in a folded compact manner in the trunk of the vehicle. When the need for the canopy arises, the shopper would unfold the canopy and it would be secured between the handles of the shopping cart and extend forwardly to be removably secured to the front of the shopping cart. When fully deployed, Applicant's canopy provides a cover which extends in a bubble-like fashion over the cart thereby permitting the shopper to protect a large quantity of groceries when the shopping cart is fully packed. The canopy is easily returned to its folded and compact mode for storage in the trunk of the vehicle after use.

OBJECTS OF THE INVENTION

The primary object of the present invention to provide for a novel protective canopy for shopping carts.

It is the further object of the present invention to provide for a novel protective canopy for shopping carts which is storable in a folded compact position.

It is a still further object of the present invention to provide for a novel canopy for shopping carts in which the folded canopy can be unfurled and quickly secured to the shopping cart providing for a bubble-like cover over the shopping cart.

A still further object of the present invention is to provide for a novel canopy for shopping carts in which the canopy is easily removable secured to the shopping cart for the convenience of the shopper.

SUMMARY OF THE INVENTION

A protective canopy for a shopping cart being transformable from a folded storage state to a dome-like canopy of frame structure with nylon material secured thereto, and the protective canopy having its first end snap fit to the handle of the shopping cart and its second end removably secured to the front of the shopping cart.

BRIEF DESCRIPTION OF THE DRAWINGS

These and other objects of the present invention will become evident, particularly when taken with the detailed description and the accompanying drawings in which.

DETAILED DESCRIPTION OF THE DRAWINGS

Figure 1:
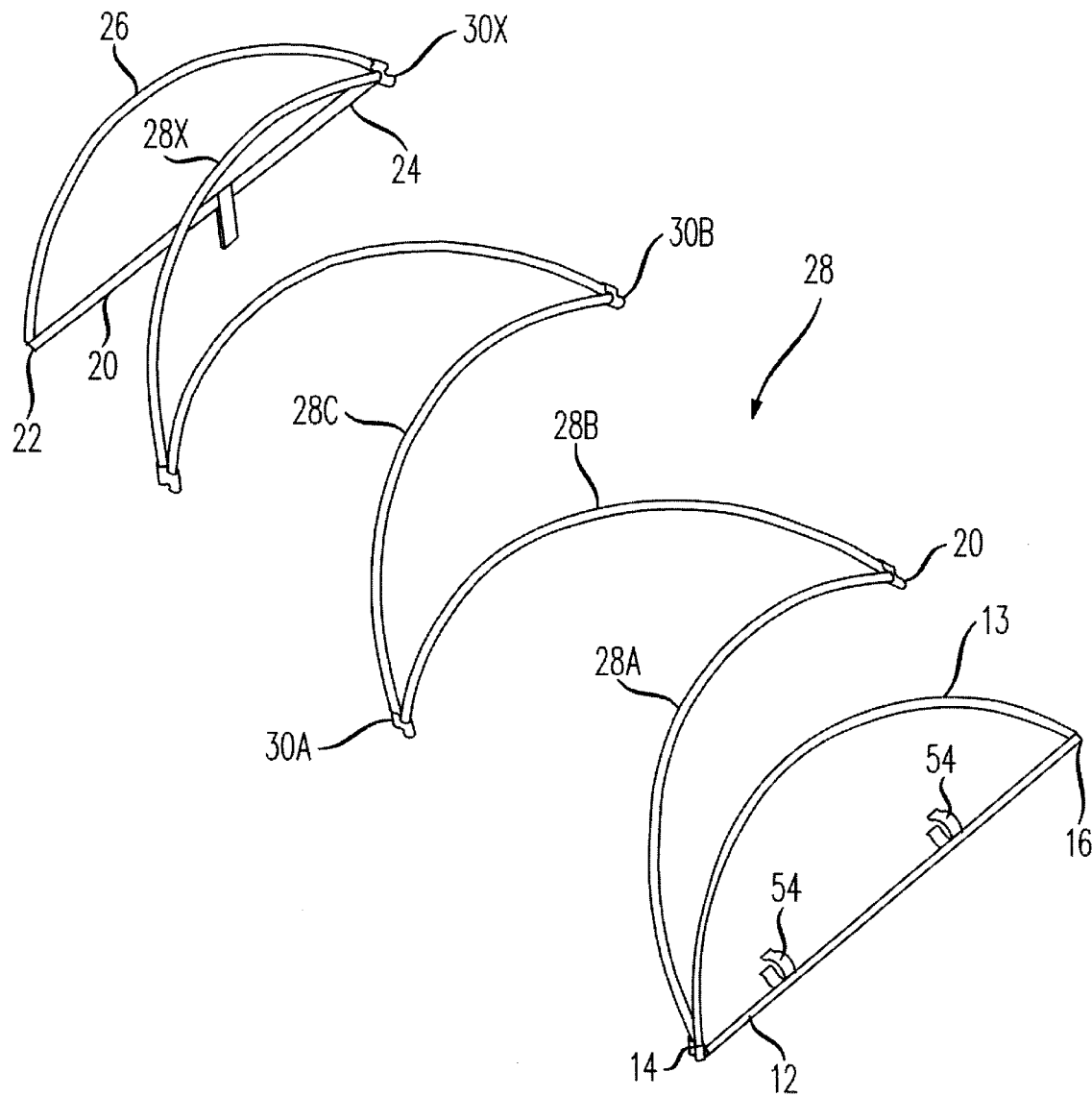
FIG. 1 is a perspective view of the frame structure of the cart canopy.

FIG. 1 is a perspective view of the frame 10 of the shopping cart canopy. Frame 10 comprises a first transverse member 12 having a first end 14 and a second end 16 and having a fixed arc member 18 secured proximate to ends 14 and 16.

Frame 10 further comprises a second transverse member 20 having a first end 22 and a second end 24 and a fixed second arc member 26 secured to ends 22 and 24.

Disposed between first transverse member 12 and second transverse member 10 are a plurality of flexible resilient arc members 28 which proximate the curvature of first fixed arc member 18 and second fixed arc member 26. The plurality of flexible resilient arc members 28 commence with a first flexible resilient arc member 28A secured to first end 14 of first transverse member 12. First flexible resilient arc member 28 terminates in connector 30 and is secured thereto. A second flexible resilient arc member 28B commences and is secured in connector 30 and terminates in connector 30A. A third flexible arc member 28C commences in connector 30A and terminates in connector 30B. This alternating of flexible resilient arc members 28 continues until flexible resilient arc member 28X terminates in a securing connector 30X on first end 22 of second transverse member 20. The arcs of flexible resilient arc members 28 approximate the arcs of first fixed arc member 18 and second fixed arc member 26 and connectors 30, 30A, 30B, etc. are positioned on an imaginary line which would extend from first end 14 of first transverse member 12 to first end 22 of second transverse member 20 and similarly, from second end 16 of first member 12 to second end 24 of second transverse member 20. In this configuration, the frame 10 comprised of fixed end members, first transverse member 12 and first fixed arc member 18 and a second transverse member 20 and second fixed arc member 26 there being disposed therebetween, the flexible resilient arc members 28 is collapsible such that second transverse member 20 and second fixed arc member 26 are moveable toward and away from the first transverse member 12 and first fixed arc member 18 in parallel arrangement. Connectors 30, 30A, 30B, etc. comprise snap fit or crimp fit connectors in which the respective ends of flexible resilient arc members 28 can be fitted and secured. The linear dimension of first transverse member 12 proximates the linear width dimension of the handle of a shopping cart and the linear dimension of second transverse member 20 approximates the linear width dimension of the nose or forward wall of a shopping cart. Frame 10 as illustrated in FIG. 1, would be disposed within and covered by a covering comprised of a waterproof nylon or similar material as illustrated in FIG. 2.

Figure 2:
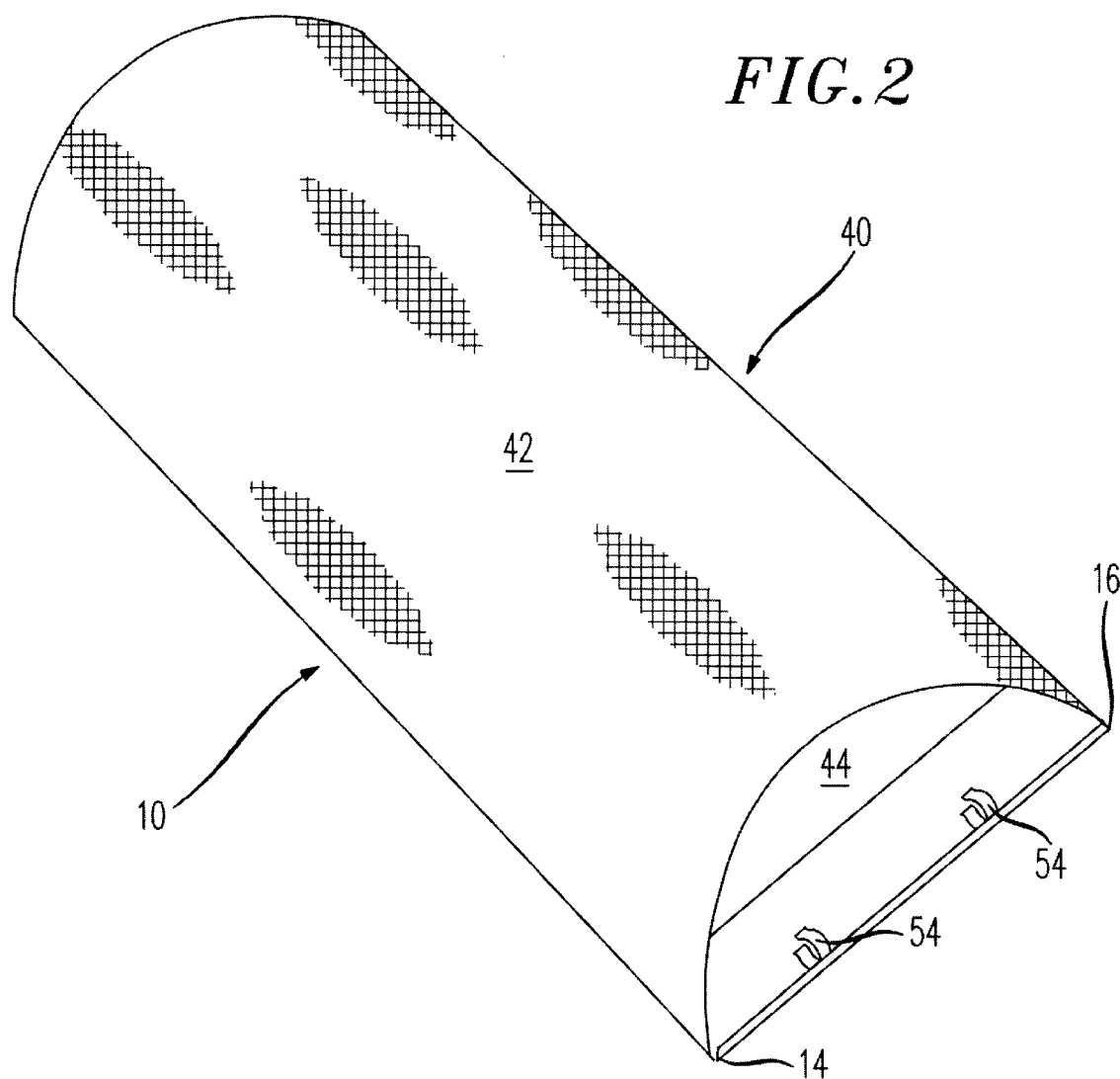
FIG. 2 is a perspective view of the frame structure and cover material of the cart canopy.

FIG. 2 illustrates a perspective view of the shopping cart canopy in which frame 10 has been covered with and substantially encapsulated within a cover 40. The cover 40 comprises a substantially semi-cylindrical portion 42 which is supported by first fixed arc member 18 and second fixed arc member 26 and the intervening flexible resilient arc members 28. Cover 40 also covers the nose end of the shopping cart canopy defined by second transverse member 20 and second fixed arc member 26. Still further, cover material 40 also substantially covers the handle end portion of the shopping cart canopy identified by reference numeral 44 and defined by first transverse member 12 and first fixed arc member 18.

Figure 3:
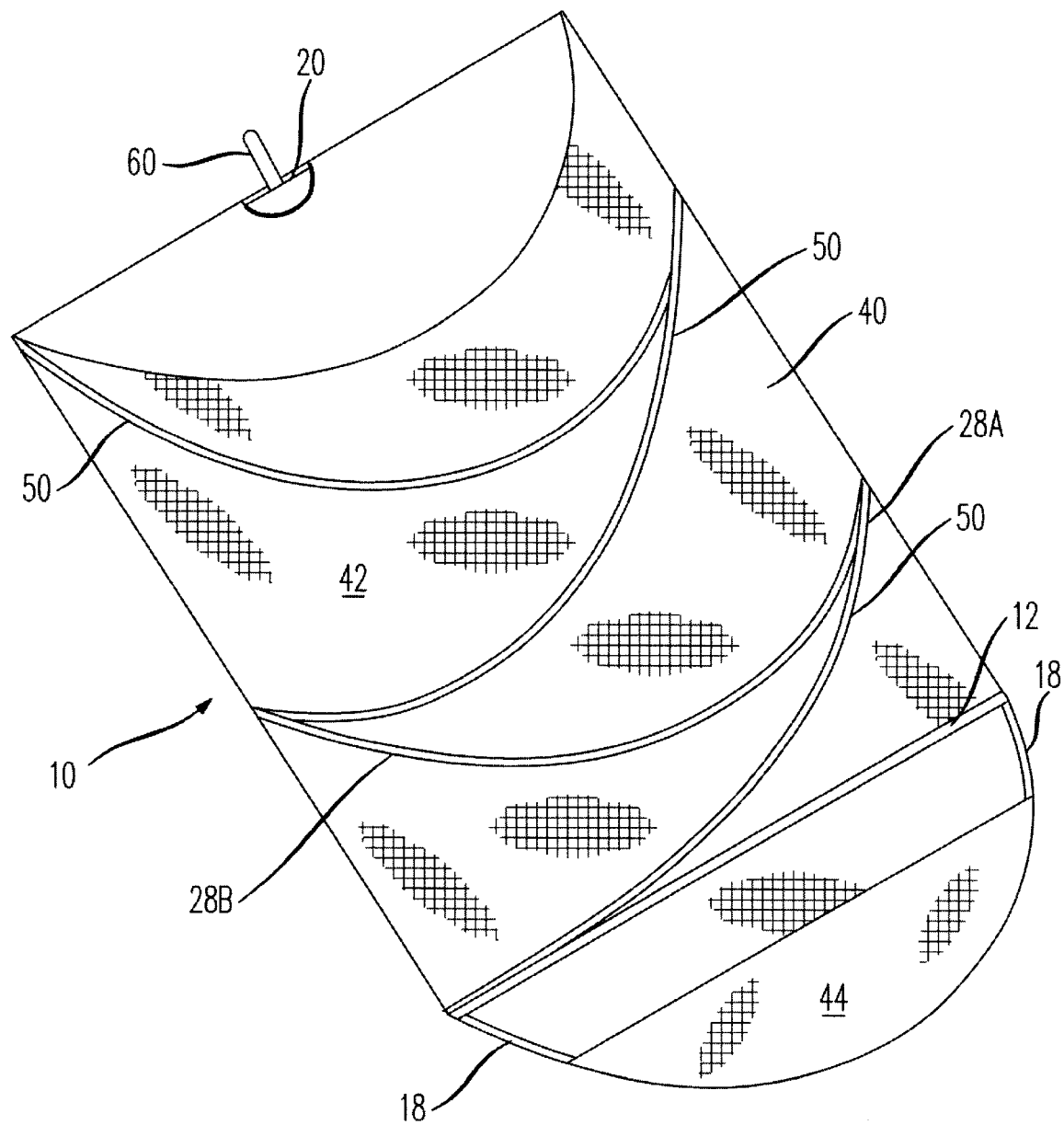
FIG. 3 is a bottom view of the frame structure and cover material of the cart canopy.

FIG. 3 is a bottom perspective view of the canopy frame 10 with the cover 40 secured thereto. It can be seen from FIG. 3, that frame 10 is substantially encapsulated by cover 40. First transverse member 12 is not enclosed by cover 40 for reasons stated hereafter. However, first fixed arc member 18 is substantially encapsulated by cover 40, as well as second fixed arc member 26 and second transverse member 20. Further, flexible resilient arc members 28 are encapsulated by cover 40, as well as connectors 30. By encapsulation, it is meant that the aforesaid members are enclosed by various channel members 50 formed in cover 40 and sewn or heat pressed so as to encapsulate the aforesaid members within the channels such that frame 10 and cover 40 cooperate so as to provide the canopy with rigid structure when fully extended.

Figure 4:
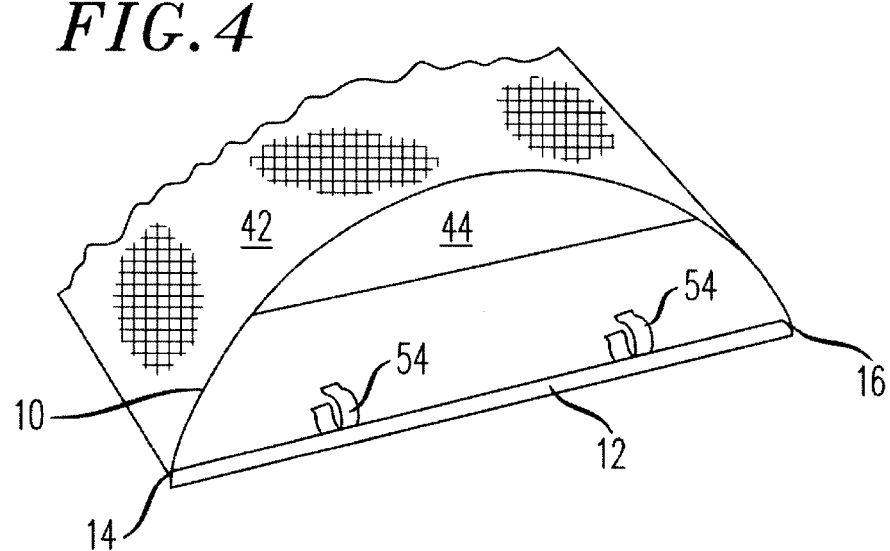
FIG. 4 is a perspective view of the handle engaging portion of the frame structure and a portion of the shopping cart to be covered.

FIG. 4 is a partial perspective end view of first transverse member 12. Secured to first transverse member 12 and depending inwardly therefrom, are a plurality of U-shaped hooks 54 which are dimensioned to the circumference of the handle of a shopping cart. Such as explained hereafter, first transverse member 12 would be positioned in parallel relationship with the handle of a shopping cart such that the handle of the shopping cart would be slidably engageable within the U-shaped hooks 54.

Figure 6:
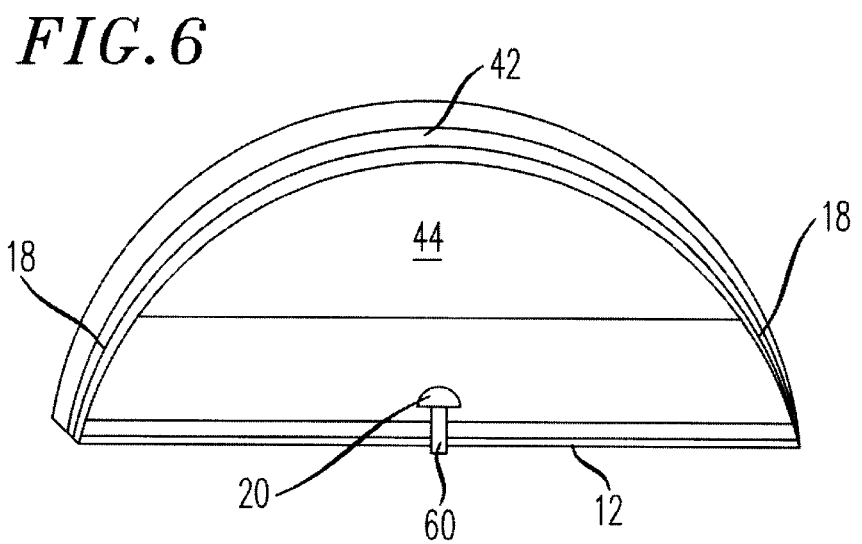
FIG. 6 is a perspective view of the cart canopy in a collapsed mode.

FIG. 6 illustrates the cart canopy in a collapsed mode wherein second transverse member 20 and second fixed arc member 26 are moved towards first transverse member 12 and first fixed arc member 18 thus compressing the cover 10 and intervening flexible resilient arc members 28 such that the cart canopy, in the collapsible state, can be easily stored in the trunk or back seat of an automobile. Referring back to FIG. 3, it can be seen that second transverse member 20, preferably, is not completely encapsulated by cover 40, but a portion 56 remains unencapsulated to which there is secured a securing means in the form of a tie or velcro strap 60. In the collapsed state, tie or velcro straps 60 is cooperative with first transverse member 12 to maintain the canopy cover in a collapsed state and in a compact storage mode.

Figure 5:
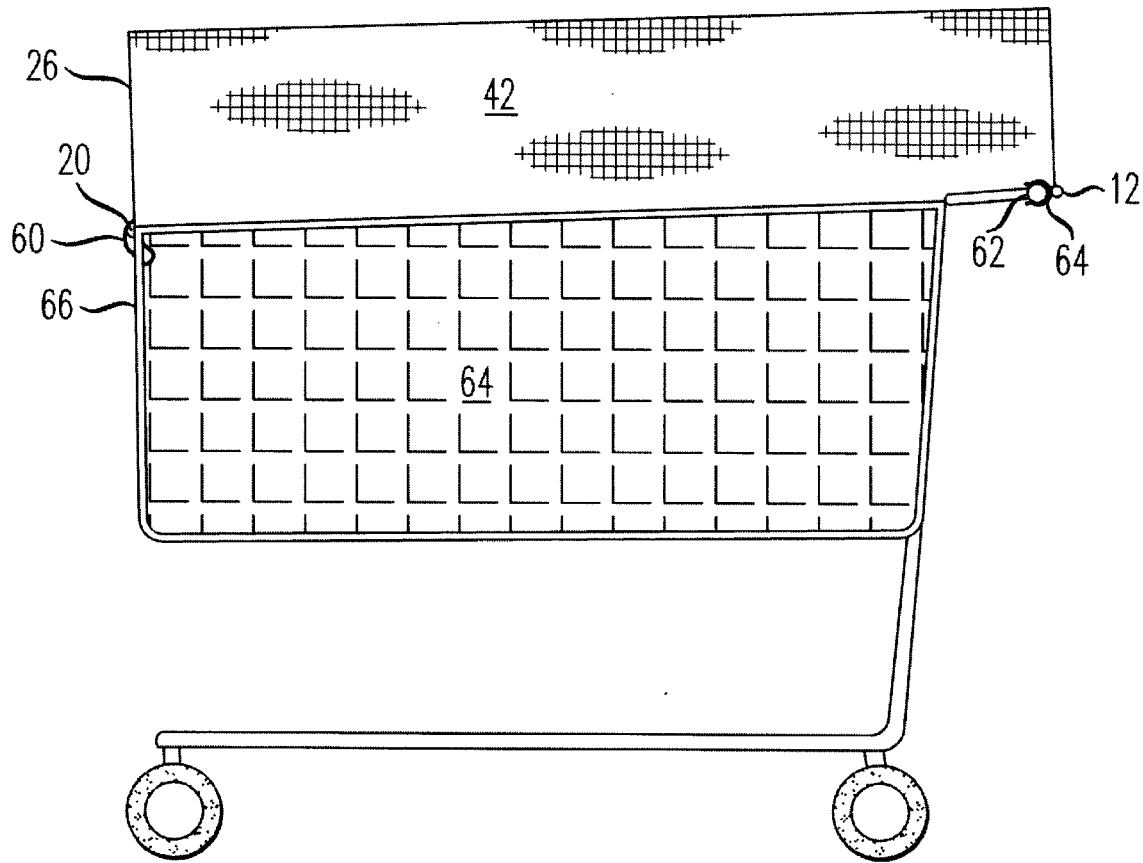
FIG. 5 is a side view of the cart canopy removable secured to a shopping cart.

In operation, as illustrated in FIG. 5, velcro strap 60 would be removed from first transverse member 12 and first transverse member 12 would be engaged with the handle 62 of a shopping cart 64 by means of hooks 54. Second transverse member 20, together with second fixed arc member 26 would then be moved away from first transverse member 12 and handle 62 of shopping cart 64 to the desired position at the nose 66 of shopping cart 64. Tie or velcro strap 60 would then be utilized to secure second transverse member 20 to the nose of the shopping cart thus covering the shopping cart and any groceries or packages positioned therein and thus protecting same from the elements.

The shopping cart canopy would contain a sufficient number of flexible resiliant arc members 28 so as to permit the canopy to be extended to various lengths in order to accommodate shopping carts having various lengths.

The user would install the canopy before leaving the shelter of the store and travel to the user's car. Thereafter the user would disengage the tie or velcro strap 60 and move the canopy cover slightly back from the nose 66 of the shopping cart 64 in order to unload the packages from the nose end of the shopping cart. The user could repeat this process in increments removing further bags from the shopping cart while still protecting bags remaining in the cart until the process of unloading the cart into the car had been completed. Thereafter, the user would collapse the canopy in the manner previously described, secure the canopy with the tie or velcro strap 60 and store the canopy in the vehicle for use on other occasion when inclement weather dictated its use.

While the present invention has been described with respect to the preferred embodiment thereof, it will be appreciated by persons of ordinary skill in the art that the present invention is not limited to what has been particularly shown and described hereinabove, but rather, the scope of the present invention is defined by the claims appended hereto.

I claim:
1. A shopping cart canopy comprising:
  a frame said frame having a first transverse member having a first end and a second end and having a first fixed arc member secured to said first end and said second end;
  a second transverse member having a first end and a second end and having a second fixed arc member secured to said first end and said second end;
  a plurality of resilient, flexible arc members disposed between said first transverse member and said second transverse member, and said flexible resilient arc members coupled at the ends thereof in staggered formation, one end of one of said plurality of said resilient flexible arc members secured to one of said ends of said first transverse member and one of said ends of one of said plurality of resilient flexible arc members secured to one of said ends of said second transverse member;
  a cover supported by said first fixed arc member, said second fixed arc member, and said flexible resilient arc members disposed therebetween, said first fixed arc member, said second fixed arc member and said flexible resilient arc members being secured within seams of said cover, said first transverse member and said first fixed arc member and said second transverse member and said second fixed arc member moveable in parallel relationship to each other so as to collapse said shopping cart canopy or extend said shopping cart canopy over a shopping cart.

2. The shopping cart canopy in accordance with claim 1 wherein said first transverse member has a plurality of U-shaped securing means cooperable with a handle of said shopping cart for removably securing said first transverse member and parallel relationship with said handle of said shopping cart.

3. The shopping cart canopy in accordance with claim 1 wherein said second transverse member has a securing means secured thereto for securing said second transverse member to an end of a shopping cart opposite said handle for securing said shopping cart canopy in an open extended position over said shopping cart and for securing said second transverse member to said first transverse member when said shopping cart canopy is in a collapsed configuration.

4. The shopping cart canopy in accordance with claim 1 wherein said first fixed arc member and said second fixed arc member and said flexible resilient arc members are secured within seams formed on the underside of said cover.

5. The shopping cart canopy in accordance with claim 1 wherein said cover is comprised of a waterproof material.

* * * * *